(12) United States Patent
Schneider et al.

(10) Patent No.: US 8,283,268 B2
(45) Date of Patent: Oct. 9, 2012

(54) METAL COLLOID-COLORED GLASS CERAMIC AND COLORLESS GLASS CONVERTIBLE INTO SAME

(75) Inventors: Meike Schneider, Taunusstein (DE); Thilo Zachau, Buerstadt-Riedrode (DE); Friedrich Siebers, Nierstein (DE); Wolfgang Schmidbauer, Mainz Finthen (DE)

(73) Assignee: Schott AG, Mainz (DE)

( * ) Notice: Subject to any disclaimer, the term of this patent is extended or adjusted under 35 U.S.C. 154(b) by 615 days.

(21) Appl. No.: 12/107,905

(22) Filed: Apr. 23, 2008

(65) Prior Publication Data

US 2008/0269038 A1 Oct. 30, 2008

(30) Foreign Application Priority Data

Apr. 24, 2007 (DE) .......................... 10 2007 020 246

(51) Int. Cl.
*C03C 10/00* (2006.01)
*C03C 10/04* (2006.01)
*C03C 10/10* (2006.01)
*B32B 15/00* (2006.01)
*B32B 17/06* (2006.01)

(52) U.S. Cl. .................. 501/5; 501/2; 501/6; 428/433

(58) Field of Classification Search .................. 501/2, 4, 501/5, 6, 7, 8, 9, 10; 428/432, 433, 434
See application file for complete search history.

(56) References Cited

U.S. PATENT DOCUMENTS

| | | | |
|---|---|---|---|
| 3,781,523 A | 12/1973 | Borom | |
| 3,839,055 A | 10/1974 | Grossman | |
| 4,461,839 A * | 7/1984 | Rittler | 501/4 |
| 6,344,423 B2 * | 2/2002 | Goto et al. | 501/4 |
| 6,387,509 B1 * | 5/2002 | Goto et al. | 428/426 |
| 6,472,338 B1 * | 10/2002 | Shimatani et al. | 501/7 |
| 2005/0252503 A1 * | 11/2005 | Siebers et al. | 126/1 R |

FOREIGN PATENT DOCUMENTS

| | | |
|---|---|---|
| EP | 1 465 460 | 10/2004 |
| GB | 863 569 | 3/1961 |
| GB | 863570 | 3/1961 |
| GB | 1 398 315 | 6/1975 |
| JP | 2003183047 | 7/2003 |
| KR | 92000701 | 8/1992 |
| KR | 920007014 | 8/1992 |
| WO | 2008/065167 | 6/2008 |

OTHER PUBLICATIONS

Sasai, J., et al. "Crystallization Effect on Non-Linear Optical Response of Silicate Glass and Glass-Ceramics Containinf Gold Nanopaeticles." Journal of Non-Crystalline Solids 290(2001) 49-56. Elsevier Science B.V.

* cited by examiner

*Primary Examiner* — Noah Wiese

(74) *Attorney, Agent, or Firm* — Michael J. Striker

(57) ABSTRACT

The colorless transparent colloid-former-containing glass that is convertible into a colorless transparent glass ceramic or a metal colloid-colored glass ceramic via respective heat treatments contains a combination of one or more metal colloid formers and one or more redox partners. The metal colloid formers are compounds containing Au, Ag, As, Bi, Nb, Cu, Fe, Pd, Pt, Sb and/or Sn. The redox partners are compounds containing As, Ce, Fe, Mn, Sb, Sn and/or W, with the proviso that the redox partner must be different from the metal colloid former.

16 Claims, No Drawings

METAL COLLOID-COLORED GLASS CERAMIC AND COLORLESS GLASS CONVERTIBLE INTO SAME

BACKGROUND OF THE INVENTION

Metal colloid-colored glass known as the so-called gold ruby glass has been known since the 17th century. The use of copper ("copper ruby") is also known for this purpose. The production of silver colloids, for example to make graduations and scales on graduated cylinders and beakers is known. A silver paint composition, i.e. a paste, which comprises a silver salt, a carrier material such as kaolin, ocher, or clay, and a sulfur compound, is applied to the glass surface for this purpose and subsequently the silver ions diffuse into the glass surface in a solid state reaction under reducing conditions and form the colored silver colloid there.

There are differing views regarding metal colloid-colored glass ceramics in the literature. According to GB 863,569 or GB 1,398,315 the metal colloids act as nuclei former during the ceramicizing of the glass to form a glass ceramic and the metal colloids were not found to color the glass ceramic. A glass that is colored red by a metal colloid, which is converted into a red colored glass ceramic, is described in JP 2003-183047 A. The inventor states that it is difficult to maintain the red color in the desired shade during the conversion of the glass into the glass ceramic. A special glass composition, which contains at least one oxide of a bivalent metal and $Bi_2O_3$, is proposed. This sort of colored glass may be converted into a glass ceramic while maintaining its color shade. According to KR 920007014 B a red colored glass ceramic may be manufactured for the construction field from a glass, which is made from a glass batch containing 10 to 20 wt. % of CaO, 0.1 to 2.5 wt. % of $S_7Cl_2$, 1.5 to 2.5 wt. % C and 0.1 to 2.5 wt. % CuO. U.S. Pat. No. 3,839,055 discloses a machinable fluoromica glass ceramic, which contains tetrasilic fluoromica. During manufacture the known standard colored compounds of the transition metal series, the rare earth series, but also colloidal glass coloring agents, such as elemental gold, are added to the glass batch. If the glass is colored immediately prior to founding, a glass containing color streaks, a synthetic marble, is produced by the ceramicizing, which in contrast to natural marble resists breakage and has a clearly improved acid resistance.

The contamination of the glass melt tank by the coloring agents during manufacture of a colored glass ceramic from a colored glass is disadvantageous. Because of this contamination very long maintenance times for removal of the coloring agents result when changing the color shade. Circumstances can be produced in which no colorless glass and/or no colorless glass ceramic can be produced with the same glass melt tank.

SUMMARY OF THE INVENTION

It is an object of the present invention to find the conditions that permit the production of a colloid former-containing colorless precursor glass, which can be converted into a transparent colorless glass ceramic by one suitable heat treatment or into a metal colloid-colored glass ceramic by another suitable heat treatment according to choice by performing the one or the other heat treatment, wherein the coloring of the glass ceramic by the other suitable heat treatment occurs as a result of the temperature program selected for the ceramicizing process.

This object is attained by the glass that is suitable for conversion into a colorless transparent or colloid-colored glass ceramic, which is defined and claimed in the main independent claim appended herein below.

The colorless transparent colloid-former-containing glass according to the present invention that is convertible into a colorless glass ceramic or a metal colloid-colored glass ceramic contains at least one metal colloid former, which comprises at least one metal selected from the group consisting of Au, Ag, As, Bi, Nb, Cu, Fe, Pd, Pt, Sb and Sn, in combination with at least one redox partner, which comprises at least one element selected from the group consisting of As, Ce, Fe, Mn, Sb, Sn and W, with the proviso that the at least one metal colloid former and the at least one redox partner are different from each other.

The invention allows the making of a colorless precursor glass and the making of a transparent colorless glass ceramic and a metal colloid-colored translucent or opaque glass ceramic from this same starter or precursor glass by the combination of a metal colloid former and a suitable redox partner, which are selected to match each other.

The metal colloid formers are compounds of the metals Au, Ag, As, Bi, Nb, Cu, Fe, Pd, Pt, Sb and Sn, while the redox partners are compounds of the elements As, Sb, Sn, Ce, Fe, W and Mn.

The amount of metal colloid former and redox partner (each calculated as oxides) is selected so that the colloid formation occurs first during the ceramicizing process and not during the forming and cooling of the precursor glass.

The amount of the metals Au, Ag, Pt, Pd in the precursor glass should be less than 0.6 wt. % (calculated as the oxides of the metals), preferably less than 0.4 wt. %. The minimum amount, with which a sufficient color is developed, amounts to 0.005 wt. % of these colloid formers.

The maximum amount of each and the total amount for Cu and Fe is 1.2 wt. %, preferably 1.0 wt. %, especially less than 0.8 wt. %. These colloid formers are used in a minimum amount of 0.1 wt. %, especially 0.2 wt. %.

The amounts of As and Sb are not critical in relation to the coloring of the green glass. Generally amounts of 3.0 wt. % of As and Sb are sufficient for production of colloidal colors. Amounts of up to 6.0 wt. % can be used without trouble. However these maximum amounts of these metals should not be exceeded because of their toxicity. The amount of As or Sb should not be less than 0.1 wt. %, especially less than 0.25 wt. % so that sufficient color is produced when these metals are used as colloid formers.

Bismuth in an amount of about 5.0 wt. % colors the precursor glass red. A bismuth content of 5.0 wt. %, preferably of 4.0 wt. %, especially of 3.5 wt. %, should not be exceeded. A minimum amount of 0.1 wt. %, especially of 0.15 wt. %, has proven suitable as the minimum amount for bismuth.

The niobium content should be between 0.1 wt. % and 6.0 wt. %, especially between 0.25 wt. % and 5.0 wt. %.

Tin does not lead to a coloring of the green glass, but promotes the tendency toward devitrification, which can lead to problems in processing and manufacture of the glass ceramic at higher tin content. Thus the tin content should be selected low enough so that the upper devitrification temperature of the glass is below 1450° C., preferably under 1400° C., especially under 1350° C. Lithium-alumino-silicate glass ceramics made largely with this technique should have a tin content preferably less than 1.9 wt. %, preferably less than 1.7 wt. %. In order to guarantee sufficient color in the glass ceramic, the minimum amount of Sn, independently of the type of the glass ceramic, should amount to 0.1 wt. %, when tin is used as single colloid former.

The total amount of the metal colloid formers should be controlled so that the green glass or precursor glass is not colored. Generally the amount of colloid formers in the green glass should not be greater than 8 wt. %.

The purpose of the redox partner is to facilitate reduction of the colloid former to the metallic state and thus colloid formation by supplying electrons.

Oxides of As, Sb, Sn, Ce, Fe, W and Mn are especially suitable as redox partners.

A single element can fulfill both roles according to the specific combination of metal colloid former and redox partner under consideration. For example tin can assist the formation of Bi, Au, As, and Sb colloids as a redox partner, but in higher concentrations can act as a metal colloid former with e.g. As or Sb.

The redox partners are generally contained in the glass melt in amounts of 0.05 wt. % to 6.0 wt. %. The preferred amounts (calculated as oxides) of the individual redox partners are as follows:

As: 0.1 wt. % to 6.0 wt. %, preferably 0.25 wt. % to 3.0 wt. %;
Sb: 0.1 wt. % to 6.0 wt. %, preferably 0.25 wt. % to 3.0 wt. %;
Sn: 0.1 wt. % to <1.9 wt. %, preferably 0.2 wt. % to 1.8 wt. %;
Ce: 0.05 wt. % to 3.0 wt. %, preferably 0.1 wt. % to 2.0 wt. %;
Fe: 0.1 wt. % to 2.0 wt. %, preferably 0.1 wt. % to 1.0 wt. %;
W: 0.1 wt. % to 4.0 wt. %, preferably 0.1 wt. % to 3.0 wt. %;
Mn: 0.05 wt. % to 3.0 wt. %, preferably 0.1 wt. % to 2.0 wt. %.

If more than one redox partner is used in a glass melt, then the sum of all the redox partners should be at least 0.1 wt. %. However in combinations with Ce or Mn, the sum should be at least 0.05 wt. %. The maximum content of 8.0 wt. % should not be exceeded.

A few of the recited elements could act as both metal colloid formers and as redox partners. It is generally clear that in the combinations the metal colloid former and the redox partner cannot be the same, but instead the metal colloid former and the redox partner in a combination must comprise different elements.

Preferred combinations of metal colloid formers and redox partners are as follows:

Sn—As
Sn—Sb
Sn—Ce
Bi—Sn
Bi—As
Bi—Sb
Au—Sn
Ag—Sn
Cu—Sn
Cu—Fe
Cu—Ce.

The combination can advantageously comprise several metal colloid formers and/or redox partners. A combination of Bi, Sn, and As has proven to be especially suitable.

Sn, As, and Sb are special universally usable redox partners, which are combinable with almost all metal colloid formers. In the event that Sn or Ce are used as redox partner, they also function as refining agent.

The action of the redox partner on the metal oxide partner can be modified in known ways, e.g. by oxidizing or reducing melt atmospheres, use of forming gas (mixtures of $N_2$ with up to 10 vol % of $H_2$) or oxygen in the melt, addition of sugar or other reducing agents to the batch, use of oxidizing compounds, e.g. nitrates, in the batch, in order to adjust the oxidation potential in the melt. However the so-called redox partner is indispensable, i.e. it cannot be eliminated.

For conversion into a colorless transparent glass ceramic improved nuclei formation for the ceramicizing can be achieved by the starting colloid formation, since the colloids themselves can act as nuclei. This permits the making of a special color neutral and transparent material with a suitable selection of the ceramicizing program (the temperatures under those used for formation of the actual colloidal color).

Every redox partner is not optimally harmonically combinable with every metal colloid former, i.e. every redox partner is not the optimum partner for combination with a specific or given metal colloid former. Thus in individual cases whether the desired transparency can be achieved by conversion to a colorless transparent glass ceramic or the desired color effect can be achieved by conversion into a colored glass ceramic with a specific or given combination of a redox partner and metal colloid former must be tested in advance.

However the required preliminary experiments of this sort for production on an industrial scale can always be performed by any professional with the aid of the teachings of the present invention without difficulty.

Any and all known glass ceramic systems can be used as a starting point for making a metal colloid-colored glass ceramic. The precursor or green glass used in the present invention especially advantageously is a lithium-alumino-silicate system or a magnesium-alumino-silicate system.

Lithium-alumino-silicate glass, which can be converted into the glass ceramic of the present invention, are known to one skilled in the glass arts in great numbers. They usually contain, as their main ingredients, $SiO_2$, 55 to 75 wt. %; $Al_2O_3$, 10 to 30 wt. %; $Li_2O$, 1.5 to 5 wt. %; $TiO_2$ and/or $ZrO_2$, 0.2 to 10 wt. %, and other oxides, such as alkaline earth oxides, alkali oxides, boron oxide, phosphorus oxide, ZnO and others.

Especially suitable lithium-alumino-silicate glasses and/or the glass ceramics made from them, have compositions, in wt. % based on oxides, of 55.0 to 75.0, especially 65.0 to 70.0, $SiO_2$; 18.0 to 26.0, especially 18.0 to 23.0, $Al_2O_3$; 1.5 to 5.0, especially 3.4 to 4.2, $Li_2O$; 0 to 3.0, especially 0.8 to 2.5, ZnO; 0 to 2.5, especially 0 to 2.0, MgO; 0 to 2.5, especially 0 to 2.0, CaO; 0 to 2.5, especially 0 to 2.0, SrO; 0 to 1.5, especially 0 to 0.8, $Na_2O$; 0 to 1.5, especially 0 to 0.8, $K_2O$; 0 to 4.0, especially 0.5 to 3.0, $TiO_2$; 0 to 4.0, especially 0.5 to 2.7, $ZrO_2$; 0 to 8.0, especially 0 to 3.0, $P_2O_5$. The low lower limit for the content of the nuclei formers $TiO_2$ and $ZrO_2$ can allow the metal colloid former to act as a nuclei former in the ceramicizing.

Magnesium-alumino-silicate glass ceramics and their suitable precursor glasses that are known are likewise numerous and usually contain, as their main ingredients, $SiO_2$, 35 to 65 wt. %; $Al_2O_3$, 15 to 45 wt. %; MgO, 2 to 20 wt. %; ZnO, 0 to 15 wt. %, and other oxides, as described in connection with the lithium-alumino-silicate glass ceramics. Also in the case of these glass ceramics $TiO_2$ and/or $ZrO_2$ can function as nuclei formers.

Especially suitable magnesium-alumino-silicate glasses and/or the glass ceramics made from them, have compositions, in wt. % based on oxides, of 35.0 to 65.0, especially 45.0 to 62.0, $SiO_2$; 15.0 to 40.0, especially 15.0 to 25.0, $Al_2O_3$; 2.0 to 20.0, especially 2.0 to 10.0, MgO; 0 to 15.0, especially 2.0 to 15.0, ZnO; 0 to 10.0, especially 0 to 3.0, BaO; 0 to 10.0, especially 0 to 3.0, SrO; 0 to 10.0, especially 0.5 to 8.0, $TiO_2$; 0.5 to 10.0, especially 0.5 to 4.0, $ZrO_2$; 0 to 10.0, especially 0 to 5.0, $P_2O_5$; and 0 to 10.0, especially 0 to 5.0 $B_2O_3$. Here also the low nuclei former content can be provided by the action of the metal colloid formers.

The conversion of the precursor glass into the glass ceramic is known and described in numerous articles and patents in the glass arts. According to the production and formation of the precursor glass it is converted into the glass ceramic by a standard two-step heat treatment. First the glass is heated to a temperature near or corresponding to the temperature at which the nuclei formation rate is a maximum. This step is a nuclei formation step and the nuclei density is determined by the temperature and holding time at this temperature. Subsequently the temperature is increased to the crystallization temperature and held there as needed.

The temperature at which the nuclei formation rate is a maximum is usually 20° C. to 80° C. above the glass transformation temperature. The temperature at which the crystal growth rate is maximum, at which the crystallization temperature orients, may be determined by a differential thermal analysis (DTA). Different crystal phases (e.g. a high quartz-mixed crystal phase or a β-spodumene-mixed crystal phase in the lithium-alumino-silicate glass ceramic), which decisively influence the properties of the glass ceramic, can be produced in the glass ceramic by a suitable choice of the crystallization temperature.

An optimum ceramicizing program must be determined for making both the transparent colorless glass ceramic and the metal colloid-colored glass ceramic from the precursor or green glass of the present invention. Usually the same nuclei formation temperature and time can be used for both embodiments. A maximum ceramicizing temperature $T_1$ is used for crystallization of the transparent embodiment of the glass ceramic, which is below the ceramicizing temperature $T_2$ for the colored embodiment of the glass ceramic. In order to determine both temperatures the following procedure is suitable: An elongated rod made from the precursor glass ("gradient rod") is held a sufficiently long time at the temperature, at which the nuclei formation rate is a maximum, in order to produce a good pre-nucleation state. A high nuclei density is especially important for the transparent glass ceramic embodiment. This nuclei formation time is between a few minutes and a few days according to the glass composition. Subsequently the rod is ceramicized in a temperature gradient oven. The temperature gradient should cover at least the range between the nuclei formation temperature and the temperature of the highest crystallization peak of the glass (determined by DTA measurements). With the help of the gradient rod the temperature $T_x$ may be determined at which the colloid coloring process occurs. In order to make a transparent glass ceramic then the ceramicizing temperature $T_1 < T_x$ is selected, so that the desired crystal phase is obtained (generally in a range of 50 to 100° C. around the crystallization peak). In contrast, the colored embodiment of the glass ceramic is made at a ceramicizing temperature $T_1 > T_x$.

The temperature $T_x$ is generally in a range between the nuclei formation temperature and the highest crystallization peak of the glass. It may be influenced by selection of the nuclei formation time: a lengthening of the nuclei formation time generally leads to a decrease of that temperature, a shortening of the time, to an increase.

In this way for example in the case of lithium-alumino-silicate glass ceramics a colorless transparent glass ceramic with a principal crystal phase of high quartz-mixed crystal and a metal colloid-colored keatite-containing glass ceramic may be produced from the precursor or green glass.

EXAMPLES

The invention is further illustrated with the help of the examples in the following table. In order to provide good comparisons of the results, the base composition of the glasses, i.e. without the metal colloid former and the redox partner, is kept the same within narrow limits.

The individual glasses with the compositions described in the table were melted in a quartz glass crucible at 1500 to 1650° C. and cast in flat cast blocks. These blocks were subsequently relaxed or de-stressed at a temperature below the glass transformation temperature Tg and slowly cooled to room temperature. The samples were made from the cast blocks and were ceramicized for 0.25 to 2 hours at the maximum temperature reported in the table (holding time 0 to 1 hour) after a nuclei formation stage in a temperature range from 730 to 790° C. The nuclei formation and ceramicizing temperatures, which were employed, were determined with the help of a DTA measurement. The transparency vis for visible light over a wavelength range of from 380 nm to 780 nm was measured for a 4 mm thick sample and is reported in the table. The thermal expansion coefficient was measured over a temperature range of from 20 to 700° C. for a selected sample.

The example numbers in the table with an asterisk (*) designate comparative examples, which are not of the present invention.

Example 1 illustrates a glass ceramic, which may be made from a colorless glass, which may be converted into a colorless transparent glass ceramic at a maximum temperature of 820° C. At a maximum temperature of 890° C. tin colloids form and produce a brown-to-black color. Generally the high tin content of over 1.9 wt. % $SnO_2$ leads to a strong devitrification tendency. The devitrification temperature, OEG, of the precursor glass is greater than 1450° C. In order to produce a good workable metal colloid-containing glass ceramic, the tin content in the form of $SnO_2$ should be advantageously less than 1.9%, preferably less than 1.7% by weight.

Example 2 illustrates a glass ceramic according to the invention, which, in contrast, has a smaller devitrification tendency than the glass ceramic of example 1 due to the reduced tin content.

Example 3 illustrates the role of tin as colloid former. When the glass ceramic contains no tin, which acts here as a metal colloid former, no colloids form during the ceramicizing and the glass ceramic that results is colorless.

Example 4 illustrates the significance of the redox partner, in this case arsenic. The glass ceramic indeed contains a large amount of tin oxide as metal colloid former (even more than in example 1). However no sufficient color is produced in the ceramicized state, since the colloids cannot be formed due to the lack of a redox partner.

In the case of tin and arsenic the identification of each of these elements as a colloid former or redox partner is not clear in structures that are rich in both arsenic and tin.

Analogous to the combination of tin and arsenic the combination of tin and antimony is illustrated in example 5. Examples 6 and 7 illustrate an additional advantageous combination of tin and arsenic.

When the amount of the metal colloid former is too greater, the formation of the colloids occurs already during the cooling stage of the glass. The glass then remains colorless in this case. Example 8 illustrates this problem. In the case of example 8 a too large amount of bismuth oxide was used, so that the precursor glass was already red colored. The amount of bismuth should thus be less than 5%. In contrast to that the composition of example 9 is produced from a transparent colorless precursor glass, which may be converted to a black or an attractive gray-violet colored glass ceramic. In the case of bismuth tin is an especially good choice for a redox partner. This may be seen by comparing examples 10 and 11. Although example 10 contains more bismuth than example 11, the glass ceramic resulting from example 10 remains colorless, since arsenic in the given amount does not act effectively as a redox partner, in contrast to the tin used in example 11.

Examples 12 to 18 illustrate addition conversions of the precursor glasses to glass ceramics according to the invention.

The present invention has attained a series of advantages, which could not be attained up to now in this form. The glass that is converted into the glass ceramic is colorless so that it does not contaminate the glass tank so that the conversion of other glasses to glass ceramics in the same glass tank is clearly more rapid and can be performed without the problems that result from converting a colored glass to a glass ceramic. The glass may also be converted to a transparent colorless glass ceramic or a metal colloid-containing black or colored glass ceramic by an appropriate choice of the ceramicizing program. This double use or application is illustrated e.g. by examples 5 and 6 in the following table.

The glass ceramic according to the invention can be used in all areas, in which the color and transparency of the glass ceramic play a role, since the transmission in different spectral ranges may be influenced by a targeted adjustment of the colloid size. For example the glass ceramic finds application as a cooking surface and in cooking utensils and apparatuses. It can be used as a fireplace window pane, outer panel of an oven, in lighting engineering, as a substrate, light filter, architectural material, or a dental material. The property, that a transparent colorless glass ceramic made according to the invention may be converted into a colored glass ceramic, offers possibilities for numerous further applications, such as a fire-resistant glass, which blocks IR radiation in a fire as a protection. Also use as a temperature sensing material is possible, e.g. for detection of over-heating. A partial conversion into a transparent and colored range in a work piece facilitates additional functionality and design possibilities.

TABLE

GLASSES AND GLASS CERAMICS OF THE INVENTION WITH COMPARATIVE
EXAMPLES AND THEIR PROPERTIES (oxide ingredient amounts in % by weight)

| | EXAMPLE | | | | | | |
|---|---|---|---|---|---|---|---|
| | 1* | 2 | 3* | 4* | 5 | 6 | 7 |
| $SiO_2$ | 68.20 | 65.49 | 69.54 | 67.74 | 63.93 | 66.57 | 68.86 |
| $Al_2O_3$ | 18.34 | 20.84 | 18.70 | 21.56 | 22.43 | 21.19 | 18.51 |
| $Li_2O$ | 3.92 | 3.71 | 4.00 | 3.84 | 3.73 | 3.77 | 3.96 |
| $Na_2O$ | | 0.41 | | 0.43 | 0.52 | 0.42 | |
| $K_2O$ | 0.57 | 0.11 | 0.58 | 0.12 | | 0.12 | 0.58 |
| MgO | 1.62 | 0.92 | 1.65 | 0.95 | 0.48 | 0.93 | 1.64 |
| CaO | | | | | | | |
| BaO | | | | | 2.02 | | |
| ZnO | 1.91 | 1.65 | 1.95 | 1.71 | 1.79 | 1.68 | 1.93 |
| $TiO_2$ | | 2.38 | | | | 1.87 | |
| $ZrO_2$ | 2.56 | 1.68 | 2.61 | 1.74 | 1.70 | 0.87 | 2.59 |
| $Ag_2O$ | | | | | | | |
| $SnO_2$ | 1.92 | 1.87 | | 1.94 | 1.83 | 1.65 | 0.97 |
| $As_2O_3$ | 0.96 | 0.93 | 0.98 | | | 0.94 | 0.96 |
| $Sb_2O_3$ | | | | | 1.59 | | |
| $Bi_2O_3$ | | | | | | | |
| Tg | @ 695° C. | @ 700° C. | @ 705° C. | @ 720° C. | @ 720° C. | @ 705° C. | @ 705° C. |
| OEG | >1450° C. | <1450° C. | n.b. | n.b. | <1450° C. | <1450° C. | <1450° C. |
| Color/Transparency | Colorless/Transparent | Colorless/Transparent | Colorless/Transparent | Colorless/Transparent | Colorless/Transparent | Colorless/Transparent | Colorless/Transparent |
| Maximum Temperature | 820° C. | 890° C. | 890° C. | 890° C. | 890° C. | 890° C. | 890° C. |
| Main Crystal Phase | High Quartz-Mixed Crystal | High Quartz-Mixed Crystal | High Quartz-Mixed Crystal | High Quartz-Mixed Crystal | High Quartz-Mixed Crystal | High Quartz-Mixed Crystal | Keatite-Mixed Crystal |
| Color/Transparency | Colorless/Transparent τvis = 85.1% | Yellow/Transparent | White/Opaque | Brown/Transparent | Colorless/Transparent; Slightly turbid | Colorless/Transparent | Bright brown/Transparent |
| Maximum Temperature | 890° C. | 1050° C. | 1050° C. | 1050° C. | 1000° C. | 1000° C. | 1000° C. |
| Main Crystal Phase | Keatite-Mixed Crystal | Keatite-Mixed Crystal | Keatite-Mixed Crystal | Keatite-Mixed Crystal | Keatite-Mixed Crystal | Keatite-Mixed Crystal | Keatite-Mixed Crystal |
| Color/Transparency | Black-brown/Opaque | Gray-black/Opaque | White/Opaque | White/Opaque | Black/Opaque | Black/Opaque | Gray-beige/Opaque |
| Thermal expansion coefficient $K^{-1}$ | $0.85 \times 10^{-6}$ | n.b. | $0.41 \times 10^{-6}$ | $0.65 \times 10^{-6}$ | $0.86 \times 10^{-6}$ | $0.86 \times 10^{-6}$ | n.b. |

| | EXAMPLE | | | | | | |
|---|---|---|---|---|---|---|---|
| | 8* | 9 | 10 | 11 | 12 | 13 | 14 |
| $SiO_2$ | 58.30 | 65.24 | 65.38 | 65.42 | 65.06 | 66.77 | 67.10 |
| $Al_2O_3$ | 19.75 | 20.78 | 20.83 | 20.84 | 20.72 | 21.25 | 21.35 |
| $Li_2O$ | 3.31 | 3.69 | 3.70 | 3.70 | 3.68 | 3.78 | 3.80 |
| $Na_2O$ | 0.24 | 0.41 | 0.41 | 0.41 | 0.41 | 0.42 | 0.42 |
| $K_2O$ | | 0.12 | 0.12 | 0.12 | 0.12 | 0.12 | 0.12 |
| MgO | 0.53 | 0.92 | 0.92 | 0.92 | 0.92 | 0.93 | 0.94 |
| CaO | | | | | | | |

TABLE-continued

GLASSES AND GLASS CERAMICS OF THE INVENTION WITH COMPARATIVE
EXAMPLES AND THEIR PROPERTIES (oxide ingredient amounts in % by weight)

| | | | | | | | |
|---|---|---|---|---|---|---|---|
| BaO | 1.81 | | | | | | |
| ZnO | 1.53 | 1.65 | 1.65 | 1.65 | 1.64 | 1.68 | 1.69 |
| $TiO_2$ | 1.63 | 2.38 | 2.38 | 2.38 | 2.37 | | |
| $ZrO_2$ | 1.25 | 1.63 | 1.63 | 1.63 | 1.63 | 1.71 | 1.72 |
| $Ag_2O$ | | | | | | | |
| $SnO_2$ | 1.53 | 0.22 | | 0.97 | 0.99 | 1.40 | 1.40 |
| $As_2O_3$ | 0.62 | | 0.99 | 0.97 | | 0.95 | 0.95 |
| $Sb_2O_3$ | | | | | | | |
| $Bi_2O_3$ | 9.49 | 2.97 | 1.98 | 0.97 | 2.47 | 0.99 | 0.50 |
| Tg | n.b. | @ 695° C. | @ 695° C. | @ 695° C. | @ 695° C. | @ 720° C. | @ 720° C. |
| OEG | <1450° C. | <1450° C. | <1450° C. | <1450° C. | <1450° C. | <1450° C. | <1450° C. |
| Color/Transparency | Red/Transparent | Colorless/Transparent | Colorless/Transparent | Colorless/Transparent | Colorless/Transparent | Colorless/Transparent | Colorless/Transparent |
| Maximum Temperature | 730° C. | 890° C. | 890° C. | 890° C. | 890° C. | 890° C. | 890° C. |
| Main Crystal Phase | amorphous | High Quartz-Mixed Crystal | High Quartz-Mixed Crystal | High Quartz-Mixed Crystal | High Quartz-Mixed Crystal | High Quartz-Mixed Crystal | High Quartz-Mixed Crystal |
| Color/Transparency | Red/Transparent | Black/Opaque | Colorless/Transparent | Light red/Transparent | Black/Opaque | Black/Opaque | Black/Opaque |
| Maximum Temperature | 890° C. | 1000° C. | 1000° C. | 1000° C. | 1000° C. | 1000° C. | 1000° C. |
| Main Crystal Phase | Keatite-Mixed Crystal | Keatite-Mixed Crystal | Keatite-Mixed Crystal | Keatite-Mixed Crystal | Keatite-Mixed Crystal | Keatite-Mixed Crystal | Keatite-Mixed Crystal |
| Color/Transparency | Gray-violet/Opaque | Gray-violet/Opaque | White/Opaque | Blue-gray/Opaque | Dark Gray/Opaque | Gray/Opaque | Gray-brown/Opaque |
| Thermal expansion coefficient $K^{-1}$ | $1.55 \times 10^{-6}$ | $1.07 \times 10^{-6}$ | $1.16 \times 10^{-6}$ | $1.05 \times 10^{-6}$ | $0.99 \times 10^{-6}$ | $0.94 \times 10^{-6}$ | $0.84 \times 10^{-6}$ |

| | | EXAMPLE | | | |
|---|---|---|---|---|---|
| | | 15 | 16 | 17 | 18 |
| | $SiO_2$ | 67.44 | 67.38 | 67.72 | 67.38 |
| | $Al_2O_2$ | 21.46 | 21.44 | 21.55 | 21.44 |
| | $Li_2O$ | 3.82 | 3.82 | 3.84 | 3.82 |
| | $Na_2O$ | 0.43 | 0.42 | 0.43 | 0.42 |
| | $K_2O$ | 0.12 | 0.12 | 0.12 | 0.12 |
| | MgO | 0.94 | 0.94 | 0.95 | 0.95 |
| | CaO | | | | |
| | BaO | | | | |
| | ZnO | 1.70 | 1.70 | 1.71 | 1.70 |
| | $TiO_2$ | | | | |
| | $ZrO_2$ | 1.72 | 1.73 | 1.74 | 1.73 |
| | $Ag_2O$ | | | | 0.50 |
| | $SnO_2$ | 1.41 | 0.50 | 0.50 | 1.00 |
| | $As_2O_3$ | 0.96 | 0.96 | 0.96 | 0.96 |
| | $Sb_2O_3$ | | | | |
| | $Bi_2O_3$ | | 0.99 | 0.50 | |
| | Tg | @ 720° C. | @ 720° C. | @ 720° C. | @ 720° C. |
| | OEG | <1450° C. | <1450° C. | <1450° C. | <1450° C. |
| | Color/transparency | Colorless/Transparent | Colorless/Transparent | Colorless/Transparent | Colorless/Transparent |
| | Maximum Temperature | 890° C. | 890° C. | 890° C. | 890° C. |
| | Main Crystal Phase | Keatite-Mixed Crystal | n.b. | n.b. | High Quartz-Mixed Crystal |
| | Color/transparency | Colorless/Translucent | Colorless/Transparent | Colorless/Transparent | Yellow/Transparent |
| | Maximum Temperature | 1000° C. | 1000° C. | 1000° C. | 1000° C. |
| | Main Crystal Phase | Keatite-Mixed Crystal | High Quartz-Mixed Crystal | High Quartz-Mixed Crystal | High Quartz-Mixed Crystal |
| | Color/transparency | Bright gray | Gray-blue | Gray-blue | Metallic yellow/Opaque |
| | Thermal expansion coefficient $K^{-1}$ | $0.71 \times 10^{-6}$ | $-0.35 \times 10^{-6}$ | $-0.76 \times 10^{-6}$ | $0.04 \times 10^{-6}$ |

*designates comparative examples;

n.b. means not determined

The disclosure in German Patent Application 10 2007 020 246.8 of Apr. 24, 2007 is incorporated here by reference. This German Patent Application describes the invention described herein above and claimed in the claims appended herein below and provides the basis for a claim of priority for the instant invention under 35 U.S.C. 119.

While the invention has been illustrated and described as embodied in a metal colloid-colored glass ceramic and colorless glass convertible into the metal colloid-colored glass ceramic, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A metal colloid-colored glass ceramic made by ceramicizing a colorless transparent precursor glass, said colorless transparent precursor glass comprising, a combination of at least one metal colloid former and at least one redox partner capable of reducing said at least one metal colloid former to a metallic state;
   wherein said at least one metal colloid former contains at least one metal selected from the group consisting of Au, Ag, As, Bi, Nb, Cu, Fe, Pd, Pt, Sb and Sn and said at least one redox partner contains at least one element selected from the group consisting of As, Ce, Fe, Mn, Sb, Sn and W;
   with the proviso that the at least one metal colloid former and the at least one redox partner are different from each other;
   wherein said precursor glass consists of a magnesium-alumino-silicate glass with a composition, in percent by weight on an oxide basis, of:

| | |
|---|---|
| $SiO_2$ | 45.0-62.0 |
| $Al_2O_3$ | 15.0-25.0 |
| MgO | 2.0-10.0 |
| ZnO | 2.0-15.0 |
| BaO | 0-3.0 |
| SrO | 0-3.0 |
| $TiO_2$ | 0.5-8.0 |
| $ZrO_2$ | 0.5-4.0 |
| $P_2O_5$ | 0 |
| $B_2O_3$ | 0-5.0; | whereby the metal colloid-colored glass ceramic contains at least a part of said at least one metal in said metallic state.

2. The metal colloid-colored glass ceramic as defined in claim 1, containing substantially no halides.

3. The metal colloid-colored glass ceramic as defined in claim 1, which is free of sulfur.

4. The metal colloid-colored glass ceramic as defined in claim 1, containing substantially no nickel.

5. The metal colloid-colored glass ceramic as defined in claim 1, containing substantially no cobalt.

6. The metal colloid-colored glass ceramic as defined in claim 1, wherein, when present in said glass ceramic, said at least one metal colloid former that contains Au, Ag, Pt or Pd is present in an amount of 0.005 to 0.6, in wt. % on an oxide basis; when present in said glass ceramic, said at least one metal colloid former that contains Cu or Fe is present in an amount of 0.1 to 1.2, in wt. % on an oxide basis; when present in said glass ceramic, said at least one metal colloid former that contains As or Sb is present in an amount of 0.1 to 6.0, in wt. % on an oxide basis; when present in said glass ceramic, said at least one metal colloid former that contains Bi is present in an amount of 0.1 to 5.0, in wt. % on an oxide basis; when present in said glass ceramic, said at least one metal colloid former that contains Nb is present in an amount of 0.1 to 6.0, in wt. % on an oxide basis; and when present in said glass ceramic, said at least one metal colloid former that contains Sn is present in an amount of 0.1 to 1.9, in wt. % on an oxide basis.

7. The metal colloid-colored glass ceramic as defined in claim 1, wherein when present in said glass ceramic, said at least one metal colloid former that contains Au, Ag, Pt or Pd is present in an amount of 0.005 to 0.4, in wt. % on an oxide basis; when present in said glass ceramic, said at least one metal colloid former that contains Cu or Fe is present in an amount of 0.2 to 1.0, in wt. % on an oxide basis; when present in said glass ceramic, said at least one metal colloid former that contains As or Sb is present in an amount of 0.25 to 3.0, in wt. % on an oxide basis; when present in said glass ceramic, said at least one metal colloid former that contains Bi is present in an amount of 0.1 to 4.0, in wt. % on an oxide basis; when present in said glass ceramic, said at least one metal colloid former that contains Nb is present in an amount of 0.25 to 5.0, in wt. % on an oxide basis; and when present in said glass ceramic, said at least one metal colloid former that contains Sn is present in an amount of 0.1 to 1.7, in wt. % on an oxide basis.

8. The metal colloid-colored glass ceramic as defined in claim 1, wherein when present in said glass ceramic, said at least one metal colloid former that contains Au, Ag, Pt or Pd is present in an amount of 0.005 to 0.4, in wt. % on an oxide basis; when present in said glass ceramic, said at least one metal colloid former that contains Cu or Fe is present in an amount of 0.2 to 0.8, in wt. % on an oxide basis; when present in said glass ceramic, said at least one metal colloid former that contains As or Sb is present in an amount of 0.25 to 3.0, in wt. % on an oxide basis; when present in said glass ceramic, said at least one metal colloid former that contains Bi is present in an amount of 0.15 to 3.5, in wt. % on an oxide basis; when present in said glass ceramic, said at least one metal colloid former that contains Nb is present in an amount of 0.25 to 5.0, in wt. % on an oxide basis; and when present in said glass ceramic, said at least one metal colloid former that contains Sn is present in an amount of 0.1 to 1.7, in wt. % on an oxide basis.

9. The metal colloid-colored glass ceramic as defined in claim 1, wherein when present in said glass ceramic, said at least one redox partner that contains As is present in an amount of from 0.1 to 6.0, in wt. % on an oxide basis; when present in said glass ceramic, said at least one redox partner that contains Sb is present in an amount of from 0.1 to 6.0, in wt. % on an oxide basis; when present in said glass ceramic, said at least one redox partner that contains Sn is present in an amount of from 0.1 to <1.9, in wt. % on an oxide basis; when present in said glass ceramic, said at least one redox partner that contains Ce is present in an amount of from 0.05 to 3.0, in wt. % on an oxide basis; when present in said glass ceramic, said at least one redox partner that contains Fe is present in an amount of from 0.1 to 2.0, in wt. % on an oxide basis; when present in said glass ceramic, said at least one redox partner that contains W is present in an amount of from 0.1 to 4.0, in wt. % on an oxide basis; and when present in said glass ceramic, said at least one redox partner that contains Mn is present in an amount of from 0.05 to 3.0, in wt. % on an oxide basis.

10. The metal colloid-colored glass ceramic as defined in claim 1, wherein when present in said glass ceramic, said at least one redox partner that contains As is present in an amount of from 0.25 to 3.0, in wt. % on an oxide basis; when present in said glass ceramic, said at least one redox partner that contains Sb is present in an amount of from 0.25 to 3.0, in wt. % on an oxide basis; when present in said glass ceramic, said at least one redox partner that contains Sn is present in an amount of from 0.2 to 1.8, in wt. % on an oxide basis; when present in said glass ceramic, said at least one redox partner that contains Ce is present in an amount of from 0.1 to 2.0, in wt. % on an oxide basis; when present in said glass ceramic, said at least one redox partner that contains Fe is present in an amount of from 0.1 to 1.0, in wt. % on an oxide basis; when present in said glass ceramic, said at least one redox partner that contains W is present in an amount of from 0.1 to 3.0, in wt. % on an oxide basis; and when present in said glass ceramic, said at least one redox partner that contains Mn is present in an amount of from 0.1 to 2.0, in wt. % on an oxide basis.

11. The metal colloid-colored glass ceramic as defined in claim 1, containing from 0.1 wt. % to 1.8 wt. % of said at least one metal colloid former that contains Sn and 0.25 wt. % to 3.0 wt. % of said at least one redox partner that contains As, or containing from 0.1 wt. % to 1.8 wt. % of said at least one metal colloid former that contains Sn and 0.25 wt. % to 3.0 wt. % of said at least one redox partner that contains Sb, or containing from 0.1 wt. % to 4.0 wt. % of said at least one metal colloid former that contains Bi and 0.1 wt. % to 1.8 wt. % of said at least one redox partner that contains Sn.

12. A metal colloid-colored glass ceramic made by ceramicizing a colorless transparent precursor glass, said colorless transparent precursor glass comprising a combination of at least one metal colloid former and at least one redox partner capable of reducing said at least one metal colloid former to a metallic state;
wherein said at least one metal colloid former contains at least one metal selected from the group consisting of Au, Ag, As, Bi, Nb, Cu, Fe, Pd, Pt, Sb and Sn and said at least one redox partner contains at least one element selected from the group consisting of As, Ce, Fe, Mn, Sb, Sn and W and said at least one redox partner comprises $SnO_2$ in an amount of from 0.97 to <1.9 wt. %;
with the proviso that the at least one metal colloid former and the at least one redox partner are different from each other;
whereby the metal colloid-colored glass ceramic contains at least a part of said at least one metal in said metallic state.

13. A metal colloid-colored glass ceramic made by ceramicizing a colorless transparent precursor glass, said colorless transparent precursor glass comprising a combination of at least one metal colloid former and at least one redox partner capable of reducing said at least one metal colloid former to a metallic state;
wherein said at least one metal colloid former contains at least one metal selected from the group consisting of Au, Ag, As, Bi, Nb, Cu, Fe, Pd, Pt, Sb and Sn and said at least one redox partner contains at least one element selected from the group consisting of As, Ce, Fe, Mn, Sb, Sn and W and said at least one redox partner comprises $As_2O_3$ in an amount of from 0.93 to 3.0 wt. %;
with the proviso that the at least one metal colloid former and the at least one redox partner are different from each other;
whereby the metal colloid-colored glass ceramic contains at least a part of said at least one metal in said metallic state.

14. A metal colloid-colored glass ceramic made by ceramicizing a colorless transparent precursor glass, said colorless transparent precursor glass comprising a combination of at least one metal colloid former and at least one redox partner capable of reducing said at least one metal colloid former to a metallic state;
wherein said at least one metal colloid former contains at least one metal selected from the group consisting of Au, Ag, As, Bi, Nb, Cu, Fe, Pd, Pt, Sb and Sn and said at least one redox partner contains at least one element selected from the group consisting of As, Ce, Fe, Mn, Sb, Sn and W and said at least one redox partner comprises $Sb_2O_3$ in an amount of from 1.59 to 6.0 wt. %;
with the proviso that the at least one metal colloid former and the at least one redox partner are different from each other;
whereby the metal colloid-colored glass ceramic contains at least a part of said at least one metal in said metallic state.

15. A metal colloid-colored glass ceramic made by ceramicizing a colorless transparent precursor glass, said colorless transparent precursor glass comprising a combination of at least one metal colloid former and at least one redox partner capable of reducing said at least one metal colloid former to a metallic state;
wherein said at least one metal colloid former comprises $SnO_2$ in an amount of from 0.1 to <1.9 wt. % and said at least one redox partner comprises $As_2O_3$ in an amount of from 0.93 to 3 wt. %;
with the proviso that the at least one metal colloid former and the at least one red ox partner are different from each other;
whereby the metal colloid-colored glass ceramic contains at least a part of said at least one metal in said metallic state.

16. A metal colloid-colored glass ceramic made by ceramicizing a colorless transparent precursor glass, said colorless transparent precursor glass comprising a combination of at least one metal colloid former and at least one redox partner capable of reducing said at least one metal colloid former to a metallic state;
wherein said at least one metal colloid former comprises $Bi_2O_3$ in an amount of from 0.1 to 5 wt. % and said at least one redox partner comprises $SnO_2$ in an amount of from 0.97 to <1.9 wt. %;
with the proviso that the at least one metal colloid former and the at least one redox partner are different from each other;
whereby the metal colloid-colored glass ceramic contains at least a part of said at least one metal in said metallic state.

* * * * *